US008176060B2

(12) United States Patent
Hewitt et al.

(10) Patent No.: US 8,176,060 B2
(45) Date of Patent: May 8, 2012

(54) ONLINE TOOL FOR REGISTERING MEDIA

(75) Inventors: Aimee Joan Hewitt, Salisbury, NC (US); Kenneth Orvin Marion, Greensboro, NC (US); Erika Jeanne Crandall, Huntersville, NC (US); Navdeep Sood, Kernersville, NC (US)

(73) Assignee: Wells Fargo Bank, N.A., Charlotte, NC (US)

( * ) Notice: Subject to any disclaimer, the term of this patent is extended or adjusted under 35 U.S.C. 154(b) by 465 days.

(21) Appl. No.: 11/779,565

(22) Filed: Jul. 18, 2007

(65) Prior Publication Data

US 2009/0024675 A1 Jan. 22, 2009

(51) Int. Cl.
*G06F 17/30* (2006.01)
*G06F 12/00* (2006.01)
(52) U.S. Cl. ........................................ 707/755; 707/803
(58) Field of Classification Search .............. 707/104.1, 707/101, 102, 755, 803
See application file for complete search history.

(56) References Cited

U.S. PATENT DOCUMENTS

| | | | |
|---|---|---|---|
| 7,043,473 B1 | 5/2006 | Rassool et al. | |
| 2003/0217120 A1* | 11/2003 | Hickey et al. | 709/219 |
| 2006/0053125 A1* | 3/2006 | Scott | 707/100 |
| 2006/0229996 A1* | 10/2006 | Keithley et al. | 705/75 |
| 2007/0192253 A1* | 8/2007 | Gill et al. | 705/51 |

* cited by examiner

*Primary Examiner* — Kuen Lu
(74) *Attorney, Agent, or Firm* — Kegler Brown Hill & Ritter; James J. Pingor

(57) ABSTRACT

A system and methodology that facilitates online registration of portable electronic media containing sensitive information is provided. The system tracks, collects and logs information associated with the media shipments and generates detailed reports. Furthermore, the system analyzes the information collected and reported to measure accountability and to calculate risk. The system provides consolidated, comprehensive information about media containing sensitive data shipped outside an organization. Additionally, the system facilitates risk management while tracking and reporting compliance around most any media activity.

20 Claims, 20 Drawing Sheets

Media Management Application

MMA Home   Help   Logout

MMA Home
Register media
My Registered media list
Media Search
Reporting
Administration

Registered Media

| Corp ID: | A427681 | Name: | ABC XYZ | | Date: | 6/9/2006 3:29:43 PM |
|---|---|---|---|---|---|---|
| Phone No: | 123-456-7899 | Department: | Service Delivery Solutions | | | |
| Email ID: | abc@xyz.com | | | | | |

| | | | Registration No | Media Name | Media Type | Business Unit Name | Sender Name | S | M | T | W | T | F | S | Status |
|---|---|---|---|---|---|---|---|---|---|---|---|---|---|---|---|
| Edit | Copy | Delete | 155 | Allstate pay Histories | Type | Retail | Sender name | n | n | n | n | n | n | n | complete |
| Edit | Copy | Delete | 153 | Media 13 | cd | e-commerce | Sender | n | n | n | n | n | n | n | complete |
| Edit | Copy | Delete | 154 | Media 13 | cd | e-commerce | Sender | n | n | n | n | n | n | n | complete |

FIG. 9

Media Management Application

MMA Home   Help   Logout

MMA Home
Register media
My Registered media list
Media Search
Reporting
Administration

Media Search

| Corp ID: | A427681 | Name: | ABC XYZ | Date: | 6/9/2006 3:29:43 PM |
|---|---|---|---|---|---|
| Phone No: | 123-456-7899 | Department: | Service Delivery Solutions | | |
| Email ID: | abc@xyz.com | | | | |

Please enter any of the following search criteria

| Corp ID: | % | | Registration Name: | % |
|---|---|---|---|---|
| Receiver Last Name: | % | | Registration Number: | 154 |
| Media Type: | All | | Data Owner: | % |
| Start Date: | 06/06/2006 | | End Date: | 06/09/2006 |
| Destination City: | % | | | |

[Get Media] [Clear]

| | Media Name | Media Type | Business Unit | Sender Name | Receiver Name | Destination | Created date | S | M | T | W | T | F | S |
|---|---|---|---|---|---|---|---|---|---|---|---|---|---|---|
| Edit Copy Delete | media 13 | CD | e-commerce | sender | Joe Smith | destination | 6/8/2006 | n | n | n | n | n | n | n |
| 1 | | | | | | | | | | | | | | |

Media Management Application

MMA Home   Help   Logout

MMA Home
Register media
My Registered media list
Media Search
Reporting
Administration MMA Reports

| Corp ID: | A427681 | Name: | ABC XYZ | | Date: | 6/9/2006 3:29:43 PM |
| Phone No: | 123-456-7899 | Department: | Service Delivery Solutions | | | |
| Email ID: | abc@xyz.com | | | | | |

Reporting Criteria

Report Name: <--Select-->
←Select→
Media Registration Information
Number Of Users Logged In to the System.
People Logged In at Given Times over the Work Day.

Reporting Criteria

Report Name: Media Items Registered

Business Unit Name:
Capital Management
Corporate and Investment Banking
Finance
General Bank Data Classification:
Public
Company Confidential Level I
Company Confidential Level II
Company Confidential Level III Start Date: 12/05/2006
End Date: 12/05/2006

[Get Report]  [Cancel]

Media Items Registered

Media Registered for the specified criteria
Start Date  07/31/2006    End Date  08/01/2006

| Media | Media Name | Registration | Registered | Date Registered |
|---|---|---|---|---|
| CD | Test 1 | 402 | Jane Doe(A234567) | 8/1/2006 |
| CD | Training Data | 403 | Jane Doe(A123456) | 8/1/2006 |

Total Number Of Media Registered   2

FIG. 10C

Reporting Criteria — 1102

Report Name: Total Number of Media Registered for Given Criteria

Start Date: 12/05/2006  Sort By: Data Classification (DC)
End Date: 12/05/2006  Sort Order: Ascending

[Get Report] [Cancel]

FIG. 11A

Total Number Of Media Registered For Given Criteria. — 1104

Media Registered for given Date and Time Period:
Start Date: 07/26/2006  End Date: 08/01/2006  Sort By: DC  Sort Order: Asc

| Data Classification | Media Name | Registration Id | Registered By | Registration date | Client records | Non client records | Employee records | Propriety records |
|---|---|---|---|---|---|---|---|---|
| Public | Training information | 390 | Bob Smith | 7/26/2006 | 0 | 0 | 0 | 56 |
| Public | Customer Records | 391 | Sharon Snow | 7/26/2006 | 67 | 12 | 400 | 34 |

Number Of Media    2
Sorted by Data Classification

| Reporting Criteria | |
|---|---|
| Report Name: | Total Number of Users Logged in for Given Criteria |
| Start Date: | 12/05/2006  00 : 00 |
| End Date: | 12/05/2006  00 : 00 |

[ Get Report ]  [ Cancel ]

Total Number Of Users Logged In For Given Criteria.

Users Logged-In for given Date and Time Period:
Start Date: 2006-08-01-13.15.00.0  End Date: 2006-08-01-14.15.00.0

| User Name | User Department | Logged in time |
|---|---|---|
| Jane Doe | Storage Operations | 08/01/06 1:38 PM |
| Jane Doe | Technology Training Team | 08/01/06 1:48 PM |
| Sarah White | Service Delivery Solutions | 08/01/06 2:11 PM |

Number Of Users Logged In to the System: 3

FIG. 13B

ONLINE TOOL FOR REGISTERING MEDIA

BACKGROUND

An increase in identify thefts has increased the importance of data protection and secure data transportation. Currently most organizations do not have information regarding shipments of media containing sensitive information relating to a customer or the organization. The lack of consolidated, actionable data about media shipments makes it difficult to accurately measure risk and accountability of the shipments.

Media containing sensitive information is typically shipped for disaster recovery/back-up and/or due to a customer request and/or for vendor use and/or a legal/regulatory requirement etc. Conventional systems do not inventory electronic media that is shipped within an organization or externally to third parties and cannot provide associated activity and compliance metrics reports. Thus, traditional systems fail to understand the accountability for electronic media in transport and stored off-site and/or the magnitude of potential exposure and do not assess compliance with corporate standards.

Typically, sensitive information can include, but is not limited to credit card details, bank account details, social security information, usernames, passwords or other proprietary information. Often, consumers receive notices that their account or personal information was lost or stolen. In most instances, there has not been evidence of fraud or identity theft from these incidents, although insufficient time may have elapsed to firmly conclude fraud has not occurred. Regardless, the events have a significant reputational impact on the companies affected by the events. Preliminary market analysis indicates that the market costs of security breaches can be as high as ten percent.

Typically, organizations ship production media between organization sites for off-site storage, or to vendors, or to customers. A significant amount of the data currently transported is highly sensitive in nature. Furthermore, the shipped media is rarely encrypted. External regulations, including state and federal legislation, require organizations to protect sensitive data, however, most organizations do not have a mechanism to track and ensure that media containing sensitive information is protected.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The system disclosed and claimed herein, in one aspect thereof, implements tracking of electronic media inventory that is shipped within an organization or externally to third parties, and provides associated activity and compliance metrics reports. The system discloses an online electronic media registration process, supporting tool and metrics reporting. The reports provided by the system are employed to provide accountability for the shipped electronic media and assess compliance with corporate standards and/or the magnitude of potential exposure.

One aspect of the system relates to a media management component that enables registration of portable electronic media (compact disks (CDs), digital versatile disks (DVDs), tapes, USB (Universal Serial Bus) drives/storage devices, etc.) and/or paper media containing sensitive information being shipped or stored outside an organization. Information is collected relating to the shipment of the portable electronic media and is employed to provide a user with various reports. Furthermore, the system analyzes information captured and reported by the media management component to measure accountability and/or calculate risk.

According to one aspect of the system, a user authentication component is employed to verify a user's identity and the user's assigned role. Menu options and features of the system can be presented to a user based on the user's assigned role. The user authentication component is further employed to confirm that a user has been trained to access the system prior to logon.

According to another aspect of the system, a media registration component receives information relating to a portable electronic media containing confidential information that being transported. The system collects the information and a report generation component provides various reports that can be viewed by specifying different criteria. The registration component assigns a unique code to each registry that has been completed.

According to another aspect of the system, an analysis component analyzes the information collected during media registration to determine risk and accountability of the registered shipments. The analysis component identifies problems and/or exceptions and notifies the appropriate personnel. The analysis component can further analyze the collected information and remind a user regarding appropriate packaging requirements.

According to yet another aspect of the system, a media recording component detects sensitive information that is burnt onto a CD/DVD or recorded on any portable media. On detection that sensitive information is being recorded on a portable media, the system prompts the user to register the media. Furthermore, the system can verify that only the information registered is recorded on the portable media to avoid errors.

Another aspect of the system relates to automatic classification of data risk. A risk classification component analyzes the information relating to a registry and automatically calculates a risk score for the registry. The risk score is also determined by content analysis of the sensitive information stored on the portable electronic media.

Yet another aspect of the system relates to monitoring and tracking shipments that contain sensitive data. The system is interfaced with third party courier systems as well as internal mailing systems. The system is further interfaced to an internal or external disaster management system and/or a lifecycle management system in accordance with an aspect of the system.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 6 illustrates an example GUI (Graphical User Interface) that authenticates a user during a login process according to an aspect of the specification.

FIG. 7A-FIG. 7D illustrate example GUIs that register portable electronic media, in accordance with an aspect of the innovation.

FIG. 8 illustrates an example GUI that displays a list of media registered by the user according to an aspect of the specification.

FIG. 9 illustrates an example GUI that can search for registered media according to user-defined criteria according to an aspect of the specification.

FIG. 10A-FIG. 10C illustrate example GUIs to generate and display a media items registered report, in accordance with an aspect of the innovation.

FIG. 11A-FIG. 11B illustrate example GUIs to generate and display total number of media registered for a given criteria, in accordance with an aspect of the innovation.

FIG. 12A-FIG. 12B illustrate example GUIs to generate and display the number of users logged in to the application, in accordance with an aspect of the innovation.

FIG. 13A-FIG. 13B illustrate example GUIs to generate and display total number of users logged in for a given criteria, in accordance with an aspect of the innovation.

DETAILED DESCRIPTION

Figure 1:
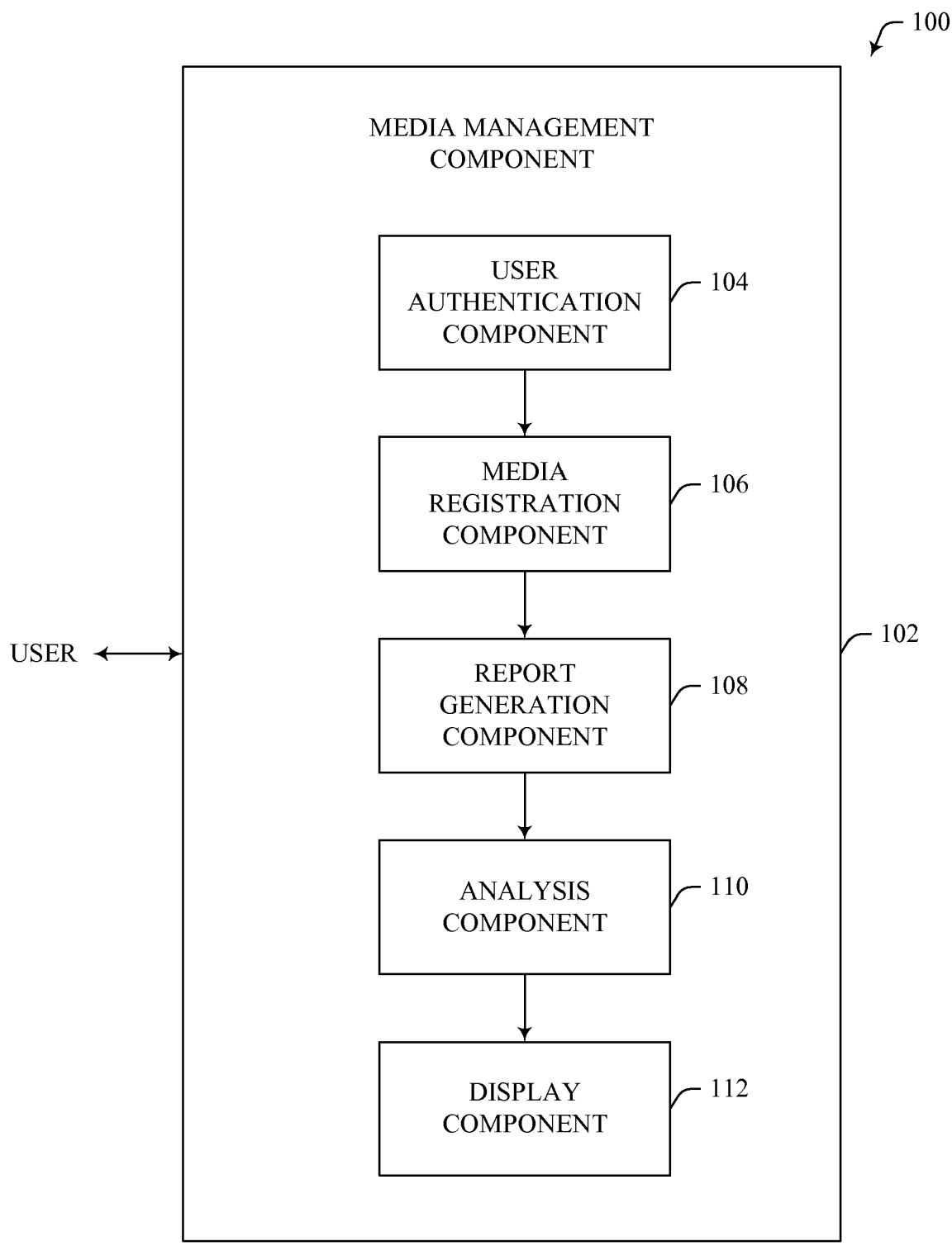
FIG. 1 illustrates a block diagram of an example system that facilitates online registration of portable electronic media.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. Pages or screens are stored and/or transmitted as display descriptions, as graphical user interfaces, or by other methods of depicting information on a screen (whether personal computer, PDA (personal digital assistant), mobile telephone, or other suitable device, for example) where the layout and information or content to be displayed on the page is stored in memory, database, or another storage facility.

Referring initially to FIG. 1, there illustrated is a media management system 100 that facilitates an online electronic media registration process, supporting tool and metrics reporting. The system 100 typically includes a media management component 102 that can be employed to register portable electronic media being transported between organization sites for off-site storage, to vendors, customers, or the like. The media management component 102 collects information regarding shipments containing sensitive data from an authorized user and generates reports based on the information collected. Furthermore, a user can interact with the media management component 102 to search and/or view the registered media as well as the reports generated. Additionally, operations of the system 100 can be performed via a browser that can be encrypted to prevent any potential data interception or other compromises.

The media management component 102 can typically include a user authentication component 104 that verifies a user's identity prior to registration of media by the user. The user authentication component 104 can also be employed to determine a user's role. The system 100 can provide different roles for access control. As an example, roles such as, but not limited to, the following can be employed, namely, user, administrator, super administrator and system administrator. In examples, a user can register electronic media whereas an administrator can maintain users (add/delete) assigned to them. A super administrator can have the same functions as the administrator, and can maintain users as well as administrators in the system. Additionally, a system administrator can manage data elements contained in tables and/or add product types. Based on the role of a user, the user can be provided with a set of functions that the user can perform.

The user authentication component 104 can employ a login interface to authenticate a user based on certain criteria such as, but not limited to, a username and/or password. It can be appreciated that most any form of authentication can be employed including biometrics such as, but not limited to, face, speech, iris, fingerprint recognition. Furthermore, context information such as, but not limited to, the user's location based on an address (e.g. Internet Protocol address) or discerned by way of location based tracking systems (e.g., global positioning systems (GPS)) can also be employed to authenticate a user.

The user authentication component 104 can further be employed to ensure that a user has received training to employ the system. The user can be granted access to the system only if the user indicates that he/she has successfully completed the training. If it is determined that the user has not completed training, the user can be prompted to complete the training before logging on to the system.

Typically, a media registration component 106 can be employed to collect information regarding electronic media containing sensitive information that is being transported. The portable electronic media can include, but is not limited to, CDs, DVDs, Flash drives, USB drives, etc. Sensitive information relating to an organization or an individual can be stored on such media and transported. However, before transporting the portable electronic media, the media registration component 106 can record information associated with the shipment.

The information collected can include, but is not limited to, a User-defined media name and a media type. The type of media can specify the device employed to record the information (e.g. CDs, DVDs, USB drives, etc.). The media registration component 106 can also gather information regarding the risk associated with the sensitive information. A risk classification matrix can be provided to determine the risk or assist in determining inherent risk. The information can further include details regarding media encryption and a description of purpose for transporting the information. The information can gather data relating to a creator, sender, owner and/or receiver. This can include, but is not limited to a name, address, city, state, zip or postal code, internal mail code, and/or country. Furthermore, various criteria associated with the shipment, namely, reason why portable electronic media is required, number of containers, number of media, authorized shipper or other courier service used, shipment frequency and/or packaging information can be recorded. The media registration component 106 can be employed to send email announcements regarding a registry to concerned authorities. Additionally, the media registration component 106 can ensure adherence to standards and recommended practices during packaging and transportation of media.

Generally, the media registration component 106 can assign a unique registration code to each media registry. The registration code can be employed to identify a shipment at a later time. Typically, a code, such as a registration number can be assigned once the registration process is completed. The media registration component 106 can employ a mechanism such as, but not limited to a sequential counter to generate the registration numbers.

The media management component 102 can further include a report generation component 108. The report generation component 108 can generate different types of reports based on the information collected by the media registration component 106. Typically, the reports can include media information based on user-defined criteria. As an example, a media registration information report can be generated based on user-specified criteria such as, a business unit name, a risk classification score and/or a date range. Another example can include a media items registered report that generate items registered during a user specified date. Yet another example report can include number of users logged on to the system. A user can specify a date and/or time range to determine the number of users accessing the system during the specified period.

The reports generated by the report generation component 108 can be printed or downloaded as PDFs (portable document format) or spreadsheets or CSV (comma-separated value) files. The reports can also be downloaded to a mobile device such as a PDA or a mobile telephone. The downloaded reports can be employed for further analysis and/or recorded for tracking purposes. Additionally, the reports can be employed for further analysis by disaster management and/or lifecycle management systems.

As depicted in FIG. 1, an analysis component 110 can typically be included in the media management component 102. The analysis component 110 can analyze the information collected for each media registry and determine problems and/or exceptions and notify the appropriate personnel. As an example, a manager can be notified when a media shipment that has been classified as high risk is not packaged as per standards. The analysis component 110 can also analyze the collected information and remind a user regarding appropriate packaging requirements. As an example, the analysis component can identify key internal mail drops and/or courier shipment locations and remind a user regarding packaging requirements when shipping media posted in these locations.

The analysis component 110 can further determine risk and accountability of the registered shipments. Additionally, the analysis component 110 can also be employed to analyze reports generated by the report generation component 108 and determine process performance, adherence to policy and procedure and/or vendor usage.

A display component 112 can be employed to display reports generated by the report generation component 108. The display component 112 can also display media registered by a particular user such that the information displayed can be sorted according to a user-specific criteria. Although the embodiments described herein are directed to registration of electronic media, it can be appreciated that the features, functions and benefits of the embodiments can be directed to tangible medium without departing from the scope of the innovation.

Figure 2:
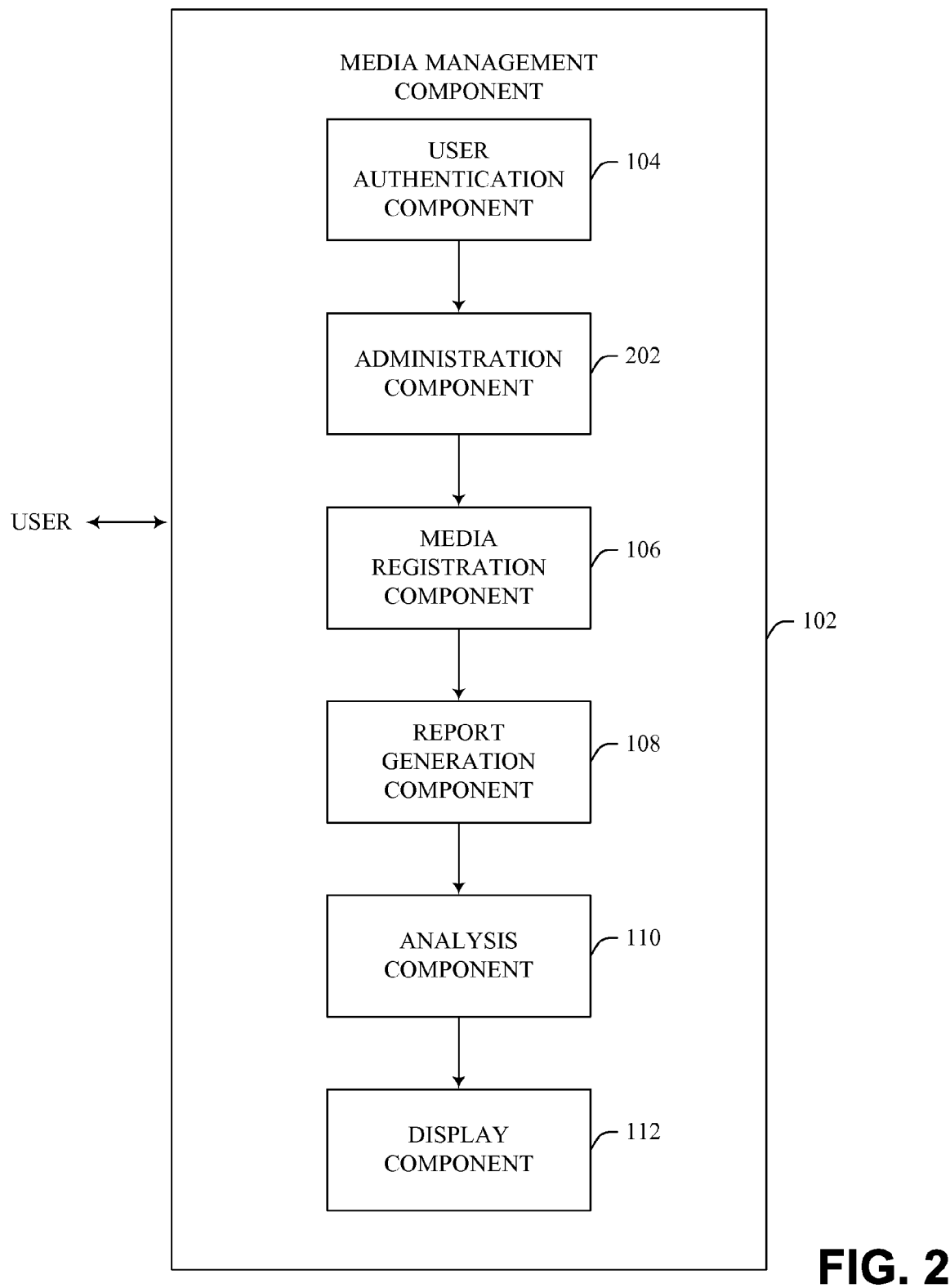
FIG. 2 illustrates a block diagram of an example system that facilitates administrative operations, in accordance with an aspect of the specification.

Referring now to FIG. 2, there illustrated is a system that facilitates administrative operations, in accordance with an aspect of the specification. The system can typically include an administration component 202 that can perform administrative operations. The administration component 202 can be employed by users that have administrative privileges, for example, administrators or super administrators. The administration component 202 can be employed to add and/or edit and/or remove users. It can be appreciated, however, the media management component 102 can also allow for self registration of a user.

As an example, a user can be added by validating the user's corporate identification number against HR (human resource) data. Furthermore, the administration component 202 can be employed to assign user roles to new users. Additionally, the administration component 202 can be employed to edit user roles of existing users and/or completely delete a user account. Users can also be notified via email or instant messaging (or other suitable protocol) regarding creation and/or modification and/or deletion of their account.

The system 200 can further employ an artificial intelligence (AI) to facilitates automating one or more features in accordance with the subject innovation. The subject innovation (e.g., in connection with registration) can employ various AI-based schemes for carrying out various aspects thereof. For example, a process for determining information associated with a data shipment can be facilitated via an automatic classifier system and process.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. In the case of media management systems, for example, attributes can be most any information about the data recorded on the media or other data-specific attributes derived from the information (e.g., the presence of key terms), and the classes can be categories or areas of interest (e.g., levels of priorities or risk).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria registration of a media shipment. The criteria can include, but is not limited to, the amount and/or type of data stored on the media, the importance of the data, and the level of confidence and/or risk associated with the shipment.

Figure 3:
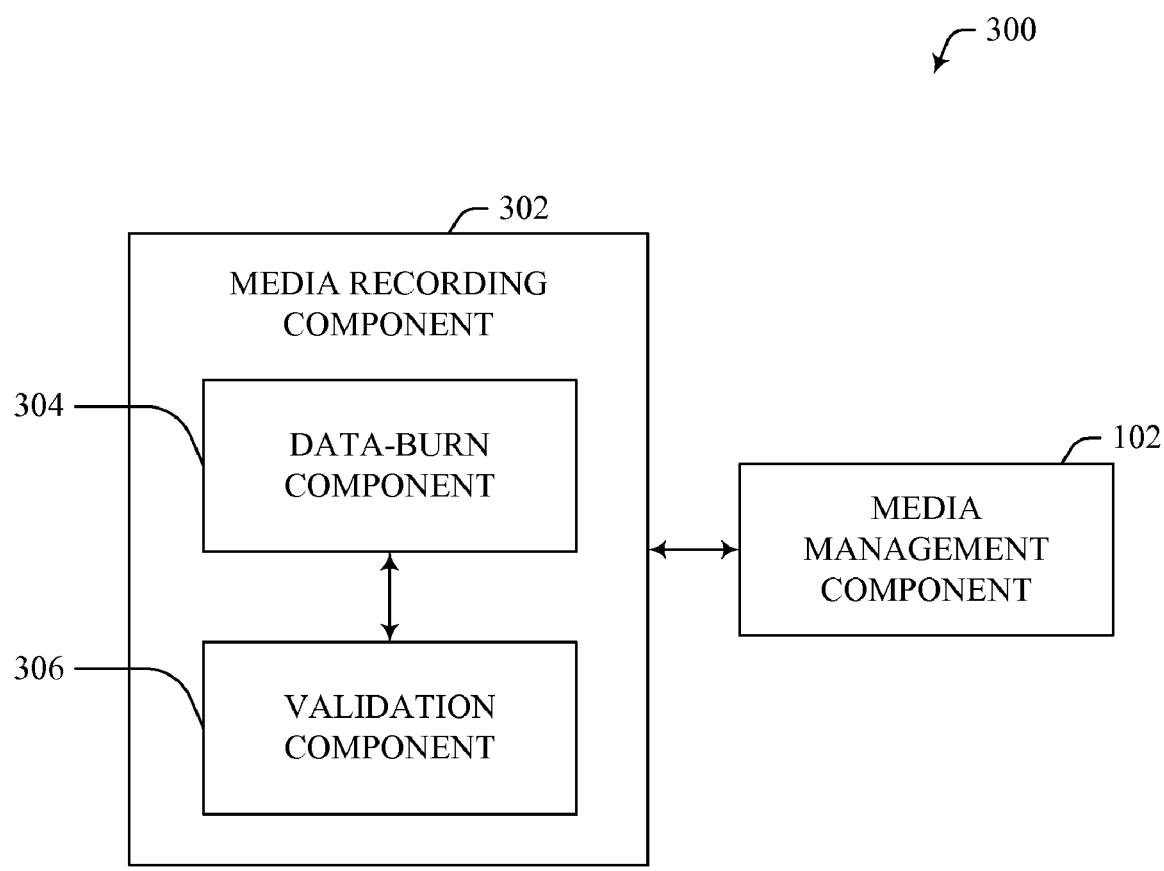
FIG. 3 illustrates a data-burn utility employed to ensure sensitive data recorded on portable electronic media is registered according to an aspect of the innovation.

FIG. 3 illustrates a system 300 that can ensure sensitive data recorded on portable electronic media is registered according to an aspect of the innovation. Generally, the system 300 can be employed to register and create media with a single interface. The system 300 can typically include a media recording component 302 that can record information onto portable electronic media, for example, a CD/DVD burner. The media recording component 302 can monitor information that is recorded onto a portable electronic medium.

Typically, a data-burn component 304 can analyze the information that is recorded on the medium to determine if the information contains sensitive data. Sensitive data can include, but is not limited to, confidential data relating to a user or an organization (e.g., credit card details, bank account information, usernames, passwords, social security numbers etc.). If the information to be recorded contains sensitive data, the data-burn component 304 can employ the media management component 102 to register information associated with the shipment. It can be appreciated that the data-burn component 304 can ensure that a registry for the sensitive information being recorded can be created prior to recording the information.

Furthermore, a validation component 306 can be employed to confirm that the data recorded is the same as that registered. This can prevent manual errors and/or malicious attempts. As an example, if a user registers that he/she is burning a CD with investment files for a particular customer, the validation component 306 can ensure that only the investment files for that customer have been recorded.

Figure 4:
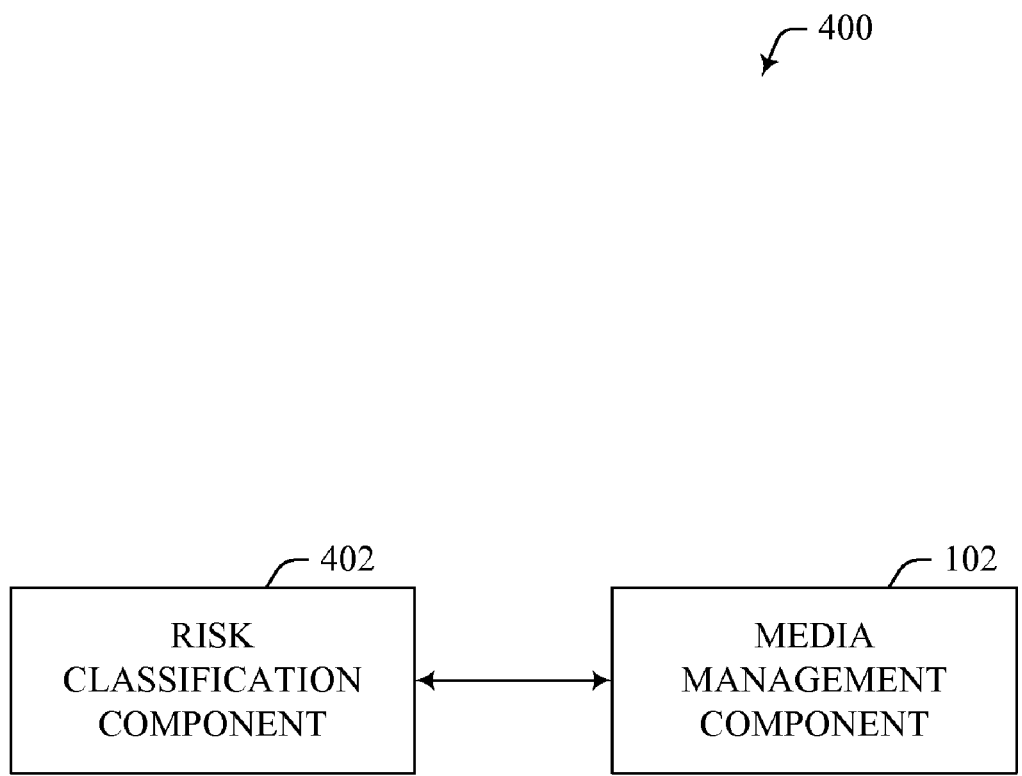
FIG. 4 illustrates a block diagram of an example system that determines the risk associated with sensitive information contained in portable electronic media according to an aspect of the system.

Referring now to FIG. 4, there illustrated is a system 400 that can automatically determine the risk associated with sensitive information contained in portable electronic media. A risk classification component 402 can be employed to calculate a risk score associated with sensitive information. The risk classification component 402 can employ content analysis to determine what kind of information is being recorded on the portable electronic media. Furthermore, the risk classification component 402 can also employ information provided by the media management component 102 regarding the registry of the shipment to determine risk.

For each registration record administered in the media management component 102, an inherent risk score can be calculated and stored, using inherent risk drivers such as, but not limited to, data classification, data criticality, number of customer records per unit, number of units shipping, frequency of shipment, carrier track record and/or receiver track record. The risk score can be a value, typically a natural number from zero to infinity. Each of the inherent risk drivers above can be assigned a value. Inherent risk driver weighting factors can be table-driven and easily changed by the risk administrator. Generally, an administrator can assign new inherent risk values and edit existing inherent risk values.

The inherent risk values for data classification can be stored in a database (not shown) or calculated automatically by the classification component 402. For each registration record's total inherent risk score, the risk classification component 402 can calculate and store a final residual risk score. The final residual risk score calculation can employ the total inherent risk score as its base and adjust the inherent risk score if a mitigation technique is employed, such as, but not limited to encryption, packaging, approved carrier, and/or storage and destruction. Mitigating technique weighting factors can be table-driven and easily changed by the risk administrator or other authorized user.

The total inherent risk score and final residual risk score can be stored into appropriate fields in the database. Based on the stored risk scores, the risk classification component 402 can ensure that a user adheres to certain packaging standards. Furthermore, the risk classification component 402 can notify appropriate personnel regarding high risk shipments.

Figure 5:
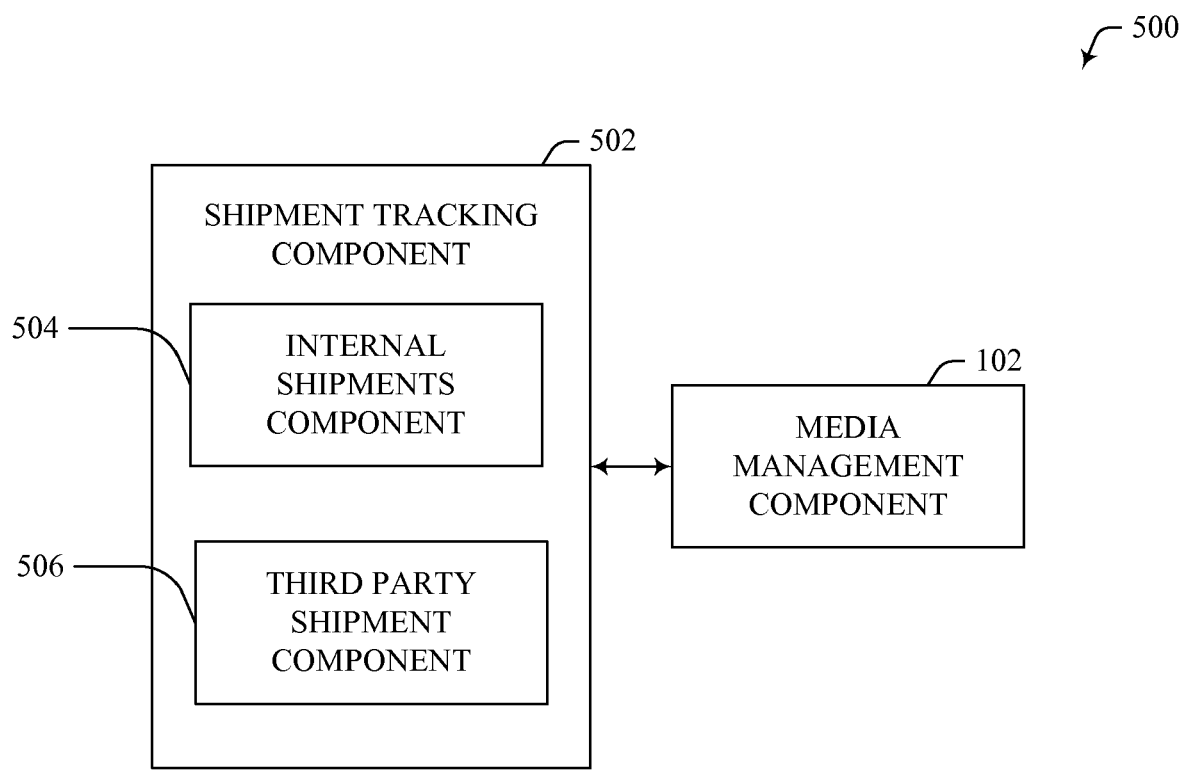
FIG. 5 illustrates a block diagram of an example system that facilitates tracking and monitoring of shipments containing sensitive information, in accordance with an aspect of the specification.

Referring now to FIG. 5, there illustrated is a system 500 that facilitates tracking and monitoring of shipments containing sensitive information. A shipment tracking component 502 can be employed to directly interface the media management component 102 to courier systems. The media management component 102 can be employed by the shipment tracking component 502 to provide information associated with a registry, such as, but not limited to, sender's name and address and/or receiver's name and address to a particular mailing service. The shipment tracking component 502 can typically include an internal shipment component 504 and a third party shipment component 506.

The internal shipment component 504 can be employed to monitor and track shipments sent via a mailing service internal to the organization, for example to an off-site location for disaster recovery or back-up. The third party shipment component 506 can be employed to monitor and track shipments sent via external mailing services, for example to customers or vendors. The internal shipment component 504 and the third party shipment component 506 can track shipments and notify the media management component 102 when shipments have been received.

Figure 6:
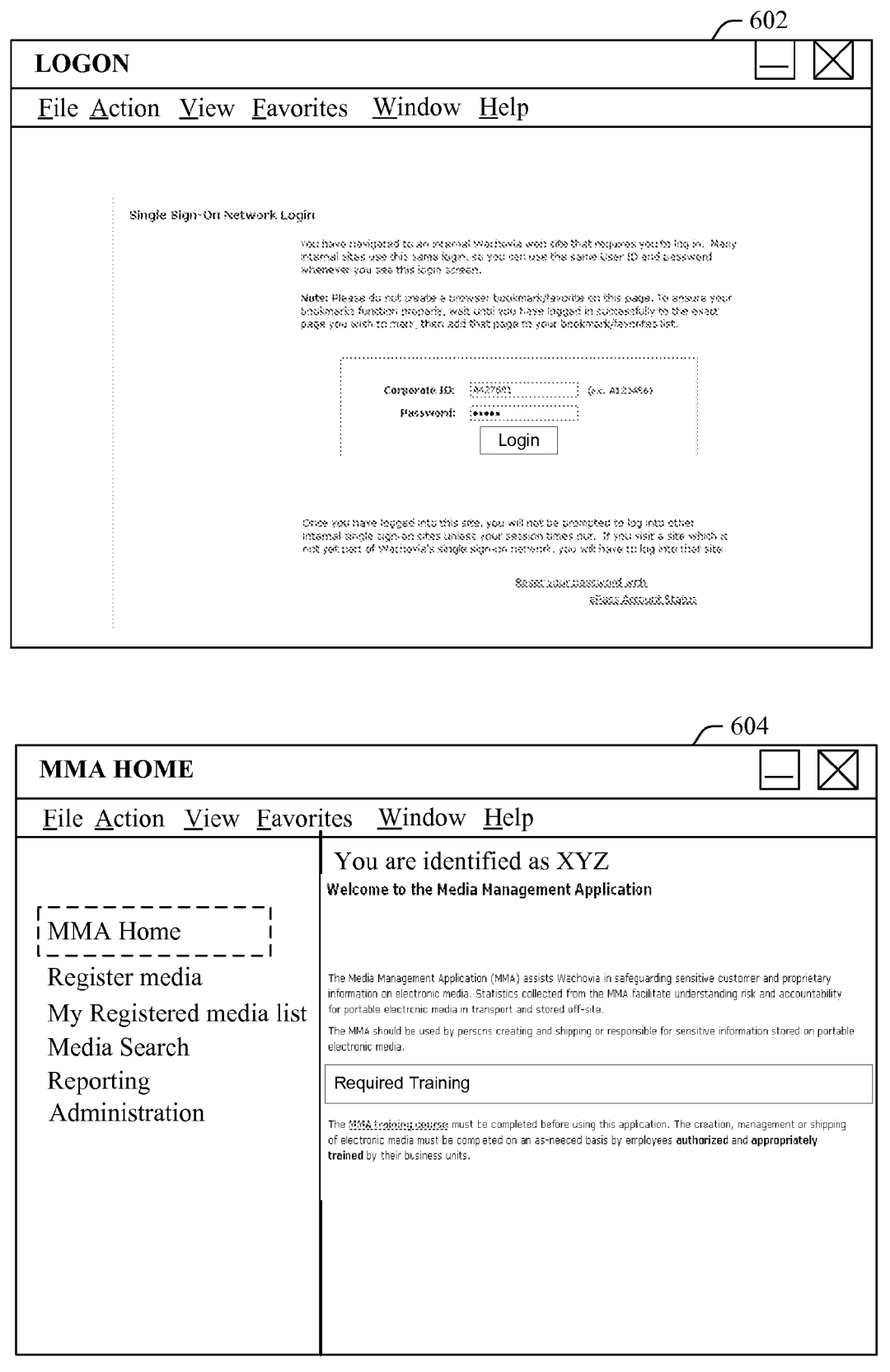

Referring now to FIG. 6, there are illustrated example GUIs (graphical user interfaces) that can employ a login process for user authentication. The example screenshot 602 illustrates a standard Single Sign-On authentication with a user's corporate ID (identification) and password. Access can be given to users by administrators whereas administrators can be granted access by super administrators and/or as approved by management. It is to be understood that, in alternative aspects, all or a subset of the information manually entered via the example GUIs can be automatically detected and thereafter populated into the forms were possible. For instance, radio frequency identification (RFID) tags can be employed to automatically populate user and possibly role information. Similarly, device identification information can be used to further identify information used in authenticating a user and thereafter in tracking shipments. These alternative aspects are to be included within the scope of this innovation and claims appended hereto.

The screenshot 604 illustrates an example homepage (e.g., Internet or intranet) that can be displayed to a user after authentication. The home page can display the user's identification. Navigation links on the left allow can access the primary sections of the application. The navigational links can vary depending on the user's role. Help and Logout access can be included in the top title bar and a link to the home page can be included on the top right.

FIG. 7A-FIG. 7D illustrate example GUIs that can register portable electronic media, in accordance with an aspect of the innovation. The Registration left-navigation menu option can initiate a media registration. Fields that are required can be marked with an asterisk as shown. Typically, drop-down menus can be provided and can include a choice of "Other", which when selected can prompt a user to populate the additional provided field.

Figures 7A, 7B:
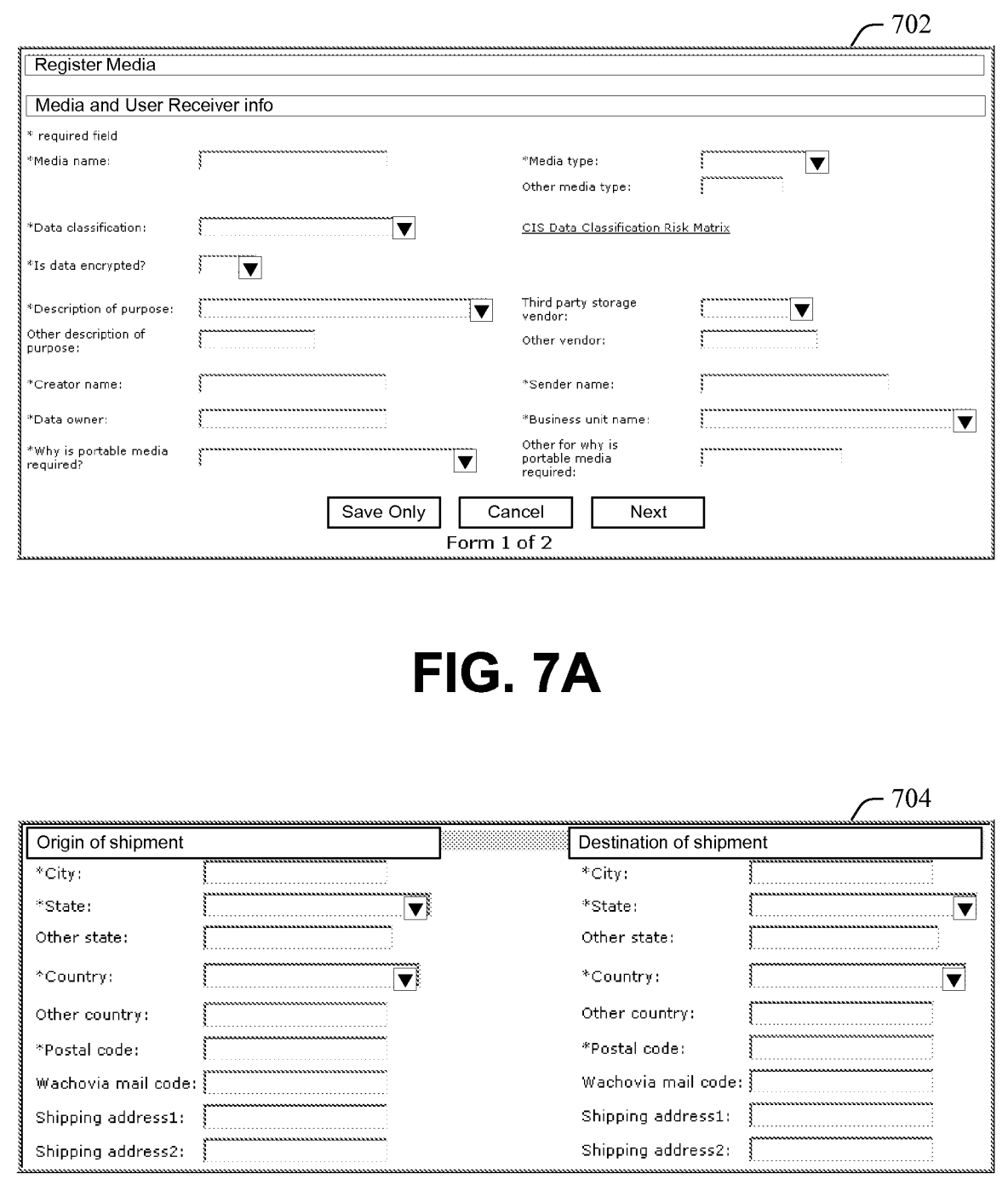

FIG. 7A illustrates an example GUI 702 that can capture basic details associated with the portable electronic media such as, but not limited to, a media name, a media type, data classification, data encryption, names of the creator and/or sender and/or owner, and/or business unit, and/or a reason for the shipment. The media name can include a free form text field describing the media, for example, "Pay Histories", "Records Update", "Special Customer Request 346221", etc. The media type can typically provide a drop-down menu for type of media, for example, Tape, CD, DVD, USB Flash Drive, Other, etc. A drop-down menu can also be provided for the risk level of the data recorded on the media. The risk level can be manually calculated from a data classification matrix and/or automatically determined by employing content analysis.

Furthermore, a drop-down menu for why portable media is required can also be provided. The options can include, but are not limited to, data file too large for transmission, receiver cannot convert to transmission, problem transmitting and/or other Referring now to FIG. 7B, there illustrated is an example screenshot 704 that displays a page that can capture shipping details. The information collected relating to shipping details can include, but is not limited to, address of shipment origin and/or address of shipment destination.

Figures 7C, 7D:
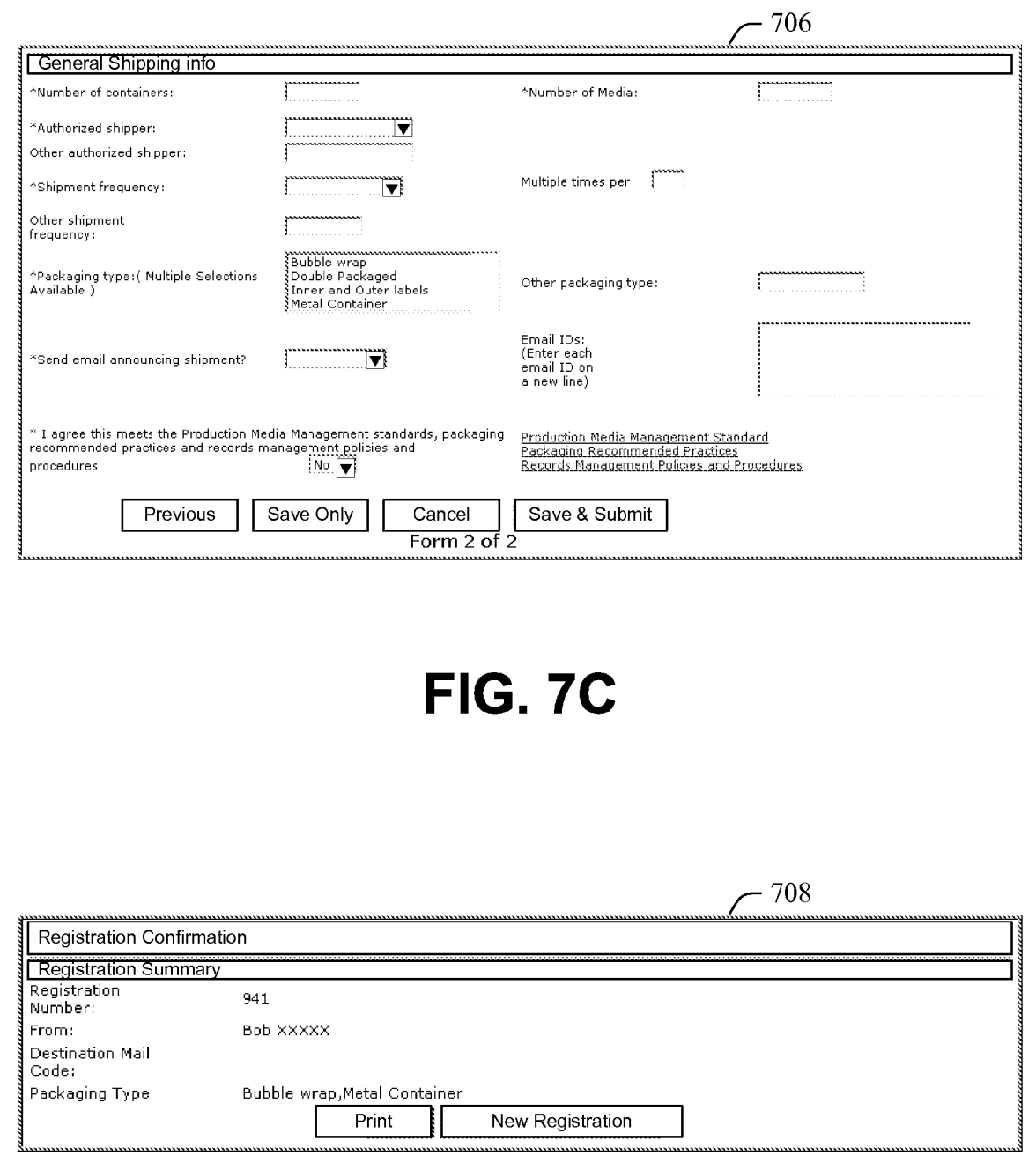

FIG. 7C illustrates an example screenshot 706 that displays a page that can collect general shipping and packaging information associated with the portable electronic media. The information can include, but is not limited to, number of containers, number of media, name of authorized shipper, shipment frequency (e.g. one time only, daily, weekly, monthly, quarterly, yearly, and other), and/or packaging type (e.g. Bubble Wrap, Double Packaged, Inner and Outer Labels, Metal Container, Plastic/Mylar Envelope or Box, Two-Inch Tape). Furthermore, the user can be provided with an option to send an email announcing shipment to one or more persons. Prior to completion, it can be verified that the shipment meets required standards, packaging recommended practices and records management policies and procedures. The record can then be submitted or saved for later submission.

FIG. 7D illustrates an example GUI 708 that can confirm registration of a portable electronic media. The final registration information can displayed and can be printed and/or saved for future reference. A new, unique registration number can be assigned to each record on completion of registration. The record can be identified by this registration number.

Referring now to FIG. 8, there is illustrated an example screenshot 800 that displays a page that can provide a list of media registered by a user. Complete and incomplete registration records can be displayed. Records can be edited, copied, or removed from view. Furthermore, records can be listed according to a user-defined (or device inferred) order.

FIG. 9 illustrates an example GUI 900 that can search for registered media according to user-defined criteria. The user-defined criteria can include, but is not limited to, a date range and/or period, a user identification number, a media name, a destination city, a registration number, a media type, and/or a data owner. The search results include records that match the specified criteria and each record can be individually viewed, copied and/or modified.

FIG. 10A-FIG. 10C illustrate example GUIs that can generate and display a media items registered report, in accordance with an aspect of the innovation. The example screenshot 1002 illustrates a page wherein a report to be displayed can be selected. Typically, the report can be selected from a drop-down menu and displayed in a new window.

The screenshot 1004 illustrates a page that can create a report on basic media information. As an example, criteria can be set to display selected results in the report. The criteria can include, but is not limited to a date range, a business unit and/or a risk classification. The screenshot 1006 illustrates an example report created for a specified date range (e.g. Jul. 31, 2006 to Aug. 1, 2006). The report can display records that match the specified criteria and information associated with it.

Referring now to FIG. 11A-FIG. 11B, there illustrated are example GUIs to generate and display total number of media registered for a given criteria, in accordance with an aspect of the innovation. The report can be created that displays records of media registered during a specified period. Additionally, the records can be sorted according to criteria, such as, but not limited to, data classification, shipped-from location, shipped-to location, carrier and/or frequency. Screenshot 1102 illustrates a GUI wherein a user can specify criteria employed to create the report and screenshot 1104 displays the report generated. The report can be downloaded, printed, and/or saved for future reference.

Figures 12A, 12B:
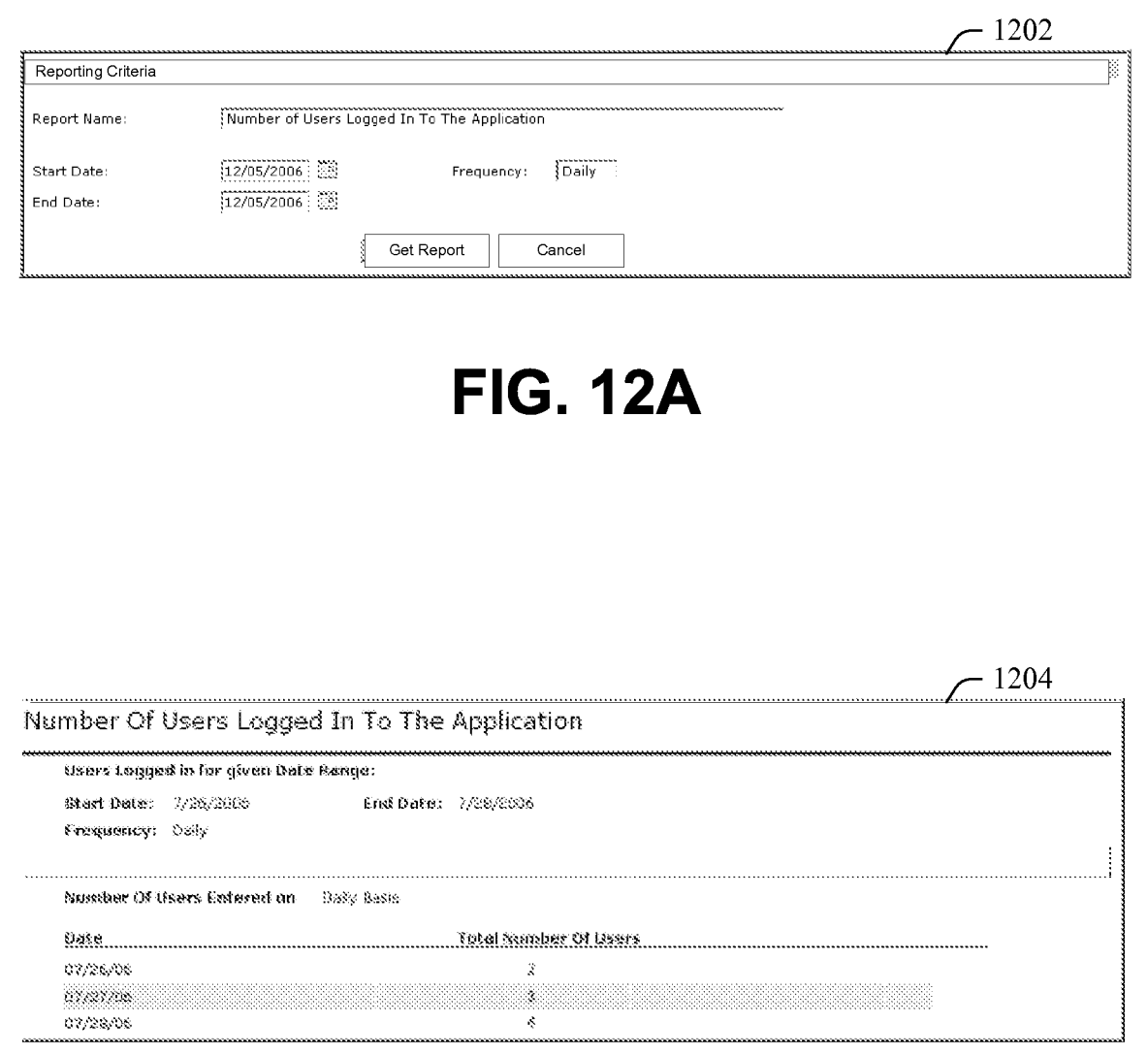

FIG. 12A-FIG. 12B illustrate example GUIs that can generate and display the number of users logged in to the application, in accordance with an aspect of the innovation. FIG. 12A illustrates a screenshot 1202 that can specify a user-defined criteria to create a report. For example, a date range can be specified along with a frequency of access, such as, daily and/or weekly. FIG. 12B illustrates a screenshot 1204 that can display a report generated on when users are accessing the system, based on the user-defined criteria.

Referring to FIG. 13A-FIG. 13B, there are illustrated example GUIs to generate and display total number of users logged in for a given criteria, in accordance with an aspect of the innovation. FIG. 13A illustrates a screenshot 1302 that can allow a user to specify a criteria to create a report of users who have accessed the system. The criteria specified can include, but is not limited to, a date and/or time range. FIG. 13B illustrates a screenshot 1304 of a report generated according to pre-defined criteria that can display a list of users that accessed the system. The list can include, but is not limited to, name of the user, name of the user's business unit and/or the time of access.

Figure 14:
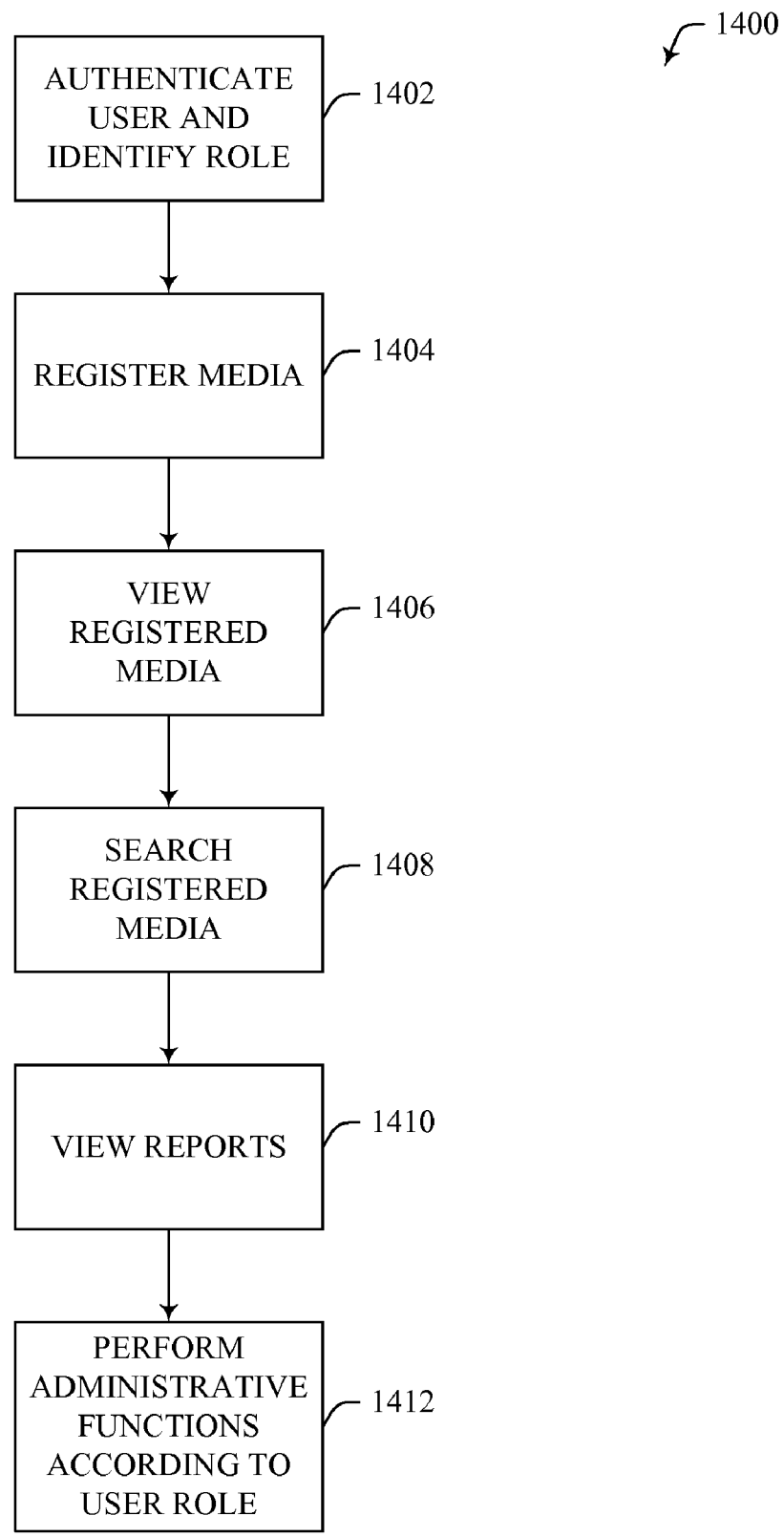
FIG. 14 illustrates an example flow chart of procedures that facilitates management of electronic portable media that contains sensitive information according to an aspect of the specification.

Referring now to FIG. 14 illustrates a methodology 1400 that can facilitate management of electronic portable media that contains sensitive information according to an aspect of the specification. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring back to FIG. 14, the methodology 1400 can facilitate registering of electronic portable media that contains sensitive information such that the registrations can be employed for further analysis. A user can be authenticated and a user identity for the authenticated user can be determined at 1402. The authentication can be via various authentication and/or verification algorithms, including, but not limited to, single sign-on or biometric authentication.

The electronic portable media being shipped can then be registered at 1404. Registration can include collection of information associated with the shipment. As an example, information related to the media, data stored on the media, packaging and/or the shipping details can be included.

The records registered by a user can be viewed at 1406. The displayed records can be copied, modified or deleted from the display. The registered media records can also be searched according to user-defined criteria at 1408. The search results can display records matching the user-defined criteria and can sort them in a user-specified order. Reports created can be viewed at 1410. The reports can be displayed based on user-specific criteria. Records displayed in the reports can be edited or copied.

Administrative functions can be performed at 1412 based on the user's role. If a user is identified to have administrative privileges, the user can perform administrative functions. Users can be added and deleted as well as user roles can be assigned to each user. The user role for a particular user can also be modified.

Figure 15:
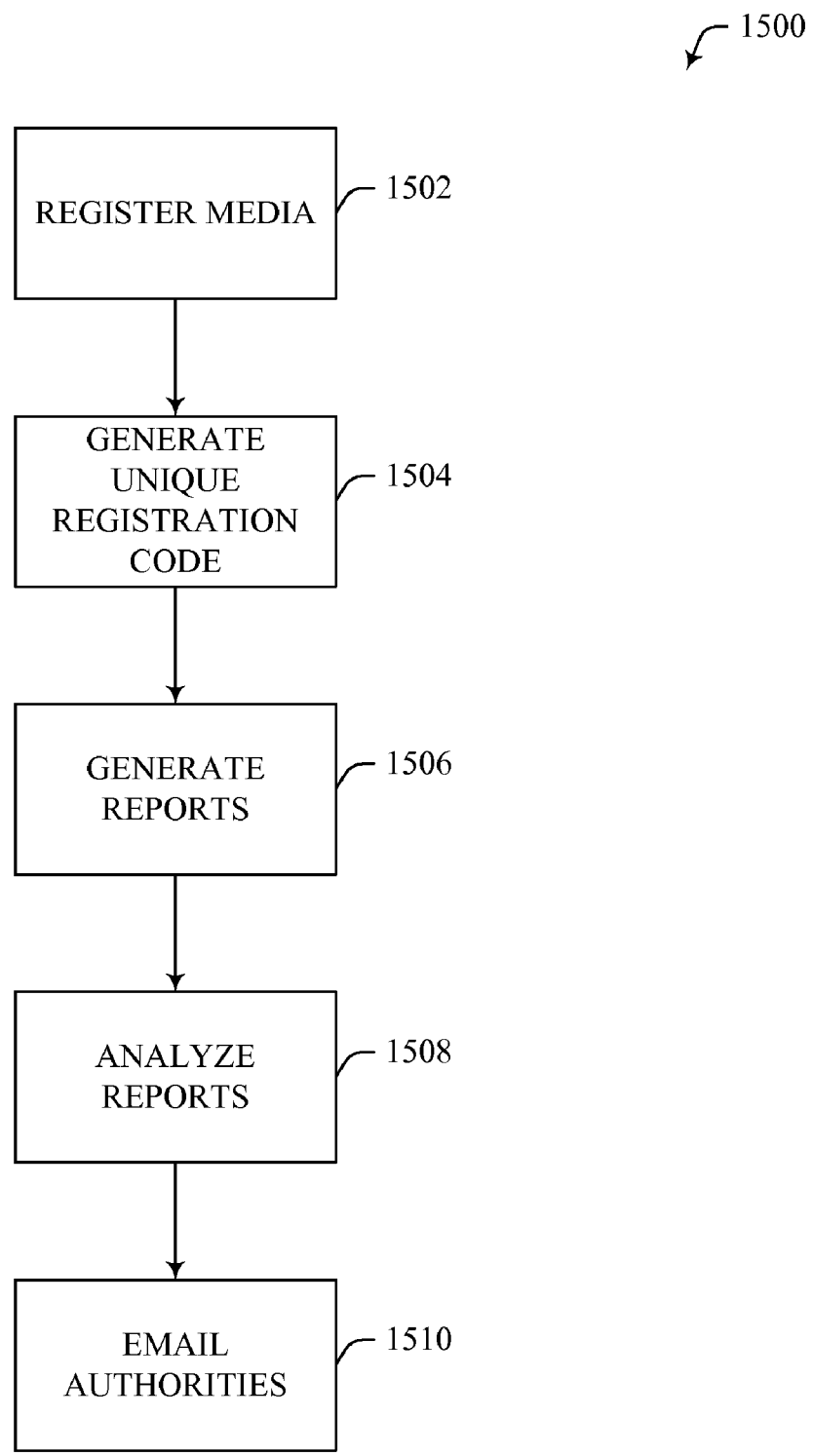
FIG. 15 illustrates an example flow chart of procedures that facilitates registration of electronic portable media containing sensitive information according to an aspect of the specification.

Referring now to FIG. 15, there illustrated is a methodology 1500 that can register electronic portable media containing sensitive information according to an aspect of the specification. When sensitive information is transported through electronic portable media, it can be registered at 1502. Registration can include submission on information associated with the shipment. For example, user-defined media name, media type, classification of data risk associated with the information on the media, media encryption, description of purpose of shipment, third-party storage vendor (if applicable), creator/sender/data-owner name, business unit name, reason why portable electronic media is required, origin of shipment address, destination of shipment address, number of containers, number of media, authorized shipper or other courier service used, shipment frequency, additional shipment frequency information and/or packaging information can be included in the registry.

A unique registration code can be generated at 1504. This code can be assigned to a completed media registration and can be employed to identify the record. Based on the information collected, various reports can be generated at 1506 such as, but not limited to, number of media registered for a given criteria, number of users logged in to the system, media items registered, etc.

The reports generated can be analyzed at 1508. The analysis can be employed to measure accountability and/or to calculate risk. Furthermore, the analysis can also identify problems and/or exceptions. Problems and/or exceptions identified can be notified to appropriate personnel at 1510. Email notifications can also be sent periodically and/or as requested, for monitoring registrations.

Figure 16:
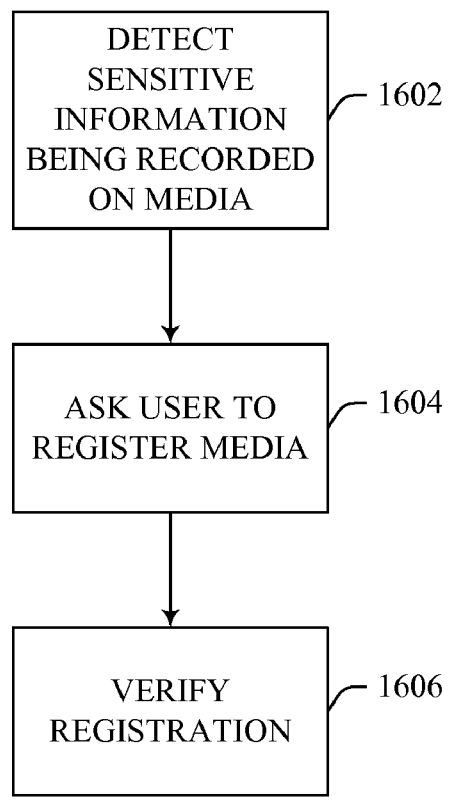
FIG. 16 illustrates an example flow chart of procedures that facilitates automatic registration of sensitive information being recorded on portable media prior to recording, in accordance with an aspect of the specification.

FIG. 16 illustrates a methodology 1600 that can facilitate automatic registration of sensitive information being recorded on portable media prior to recording, in accordance with an aspect of the specification. Information being recorded on portable electronic media can be monitored and sensitive data can be identified at 1602, for example via content analysis. Once identified, the user can be prompted to register the shipment prior to recording the sensitive information on the media. The media can be registered at 1604 and information associated with the shipment can be collected. After registration, the sensitive information can be recorded on the media, however, it can be verified that the information recorded matches the information registered at 1606. This can avoid manual errors and/or malicious attempt to register incorrect information.

Figure 17:
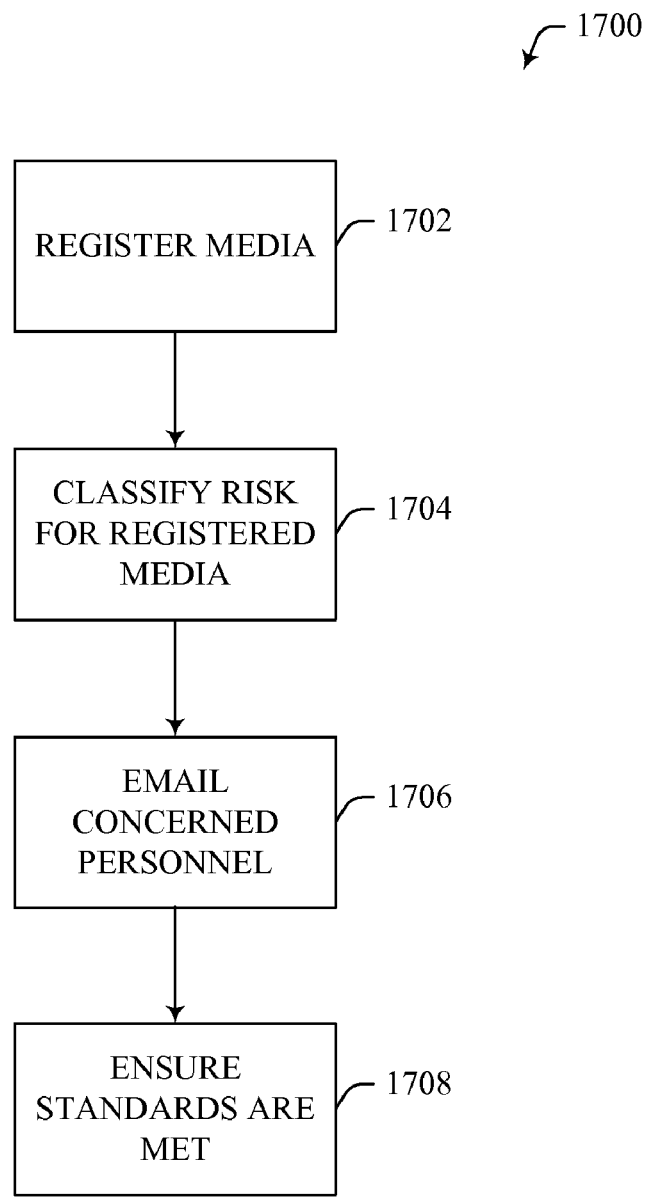
FIG. 17 illustrates an example flow chart of procedures that facilitates automatic classification of risk associated with the sensitive information contained in the portable electronic media, in accordance with an aspect of the specification.

Referring now to FIG. 17, there illustrated is a methodology 1700 that can automatically classify risk associated with the sensitive information contained in the portable electronic media, in accordance with an aspect of the specification. The media can be registered at 1702 and information associated with the shipment can be collected and analyzed. Based on the analysis a risk score can be determined and risk classification can be assigned to the registered media at 1704.

Depending on the risk score, an email can be sent to concerned personnel at 1706. For example, a record for media registered that has a high risk score can be sent via email to a manager in charge. Furthermore, based on the risk, it can be ensured that shipping standards employed are appropriate for the risk classification determined at 1708.

Figure 18:
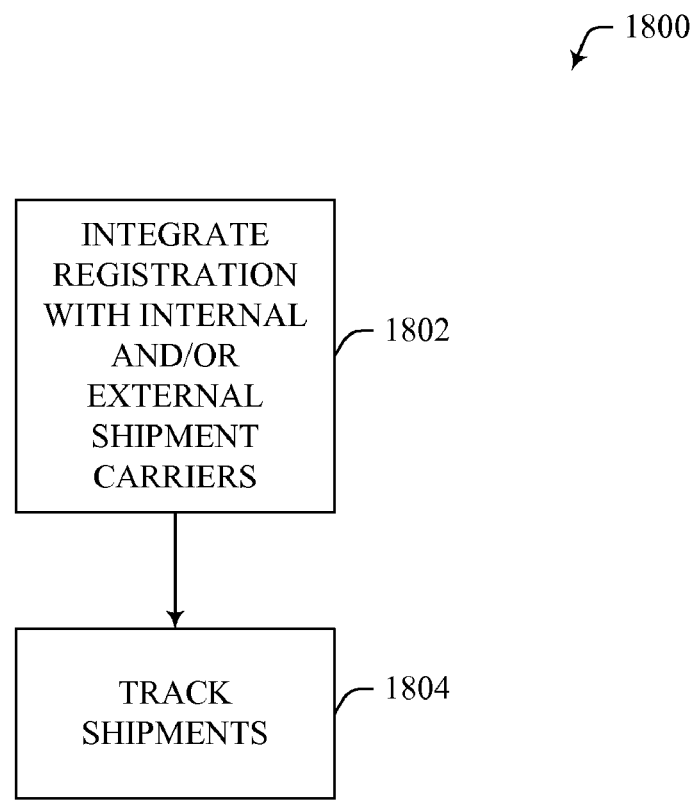
FIG. 18 illustrates an example flow chart of procedures that facilitates integration with courier systems to track and monitor shipments according to an aspect of the specification.

FIG. 18 illustrates a methodology 1800 that can facilitate integration with courier systems to track and monitor shipments according to an aspect of the specification. The registered media can be integrated with a specified mailing service at 1802. The shipment can be tracked via the particular mailing service selected at 1804.

Information associated with a registry, such as, but not limited to, sender's name and address and/or receiver's name and address can be provided to a particular mailing service (internal or third party). Furthermore, the tracking system for the selected mailing service can be integrated and a notification can be sent to concerned personnel when shipments have been received.

Figure 19:
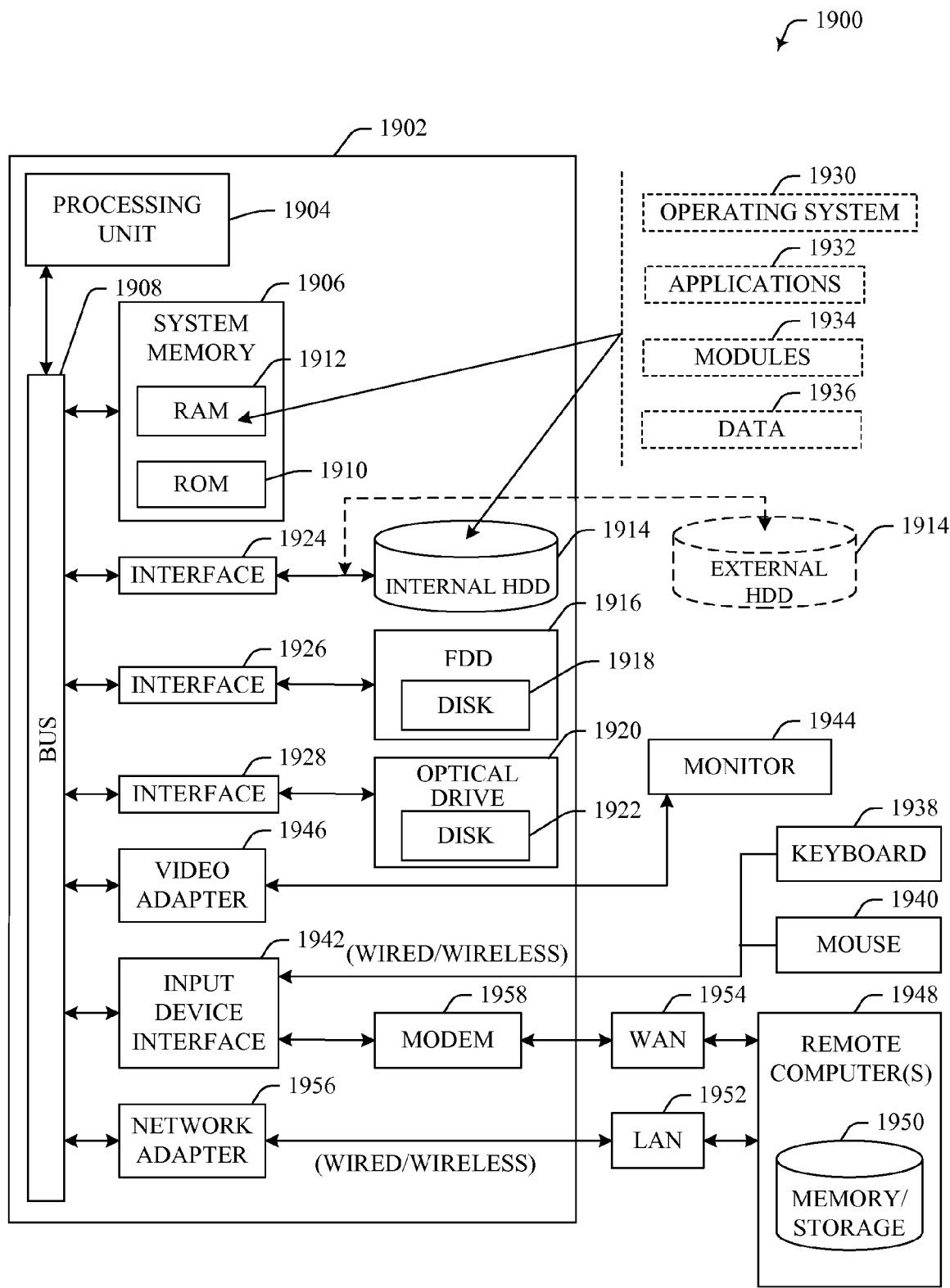
FIG. 19 illustrates a block diagram of a computer operable to execute the disclosed architecture.

Referring now to FIG. 19, there is illustrated a block diagram of a computer operable to execute the disclosed architecture for the media management system. In order to provide additional context for various aspects of the subject specification, FIG. 19 and the following discussion are intended to provide a brief, general description of a suitable computing environment 1900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 19, the example environment 1900 for implementing various aspects of the specification includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1994 interface technologies. Other external drive connection technologies are within contemplation of the subject specification.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the specification can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1994 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which may connect to a global communications network, e.g., the Internet.

When used in a LAN networking environment, the computer 1902 is connected to the local network 1952 through a wired and/or wireless communication network interface or adapter 1956. The adapter 1956 may facilitate wired or wireless communication to the LAN 1952, which may also include a wireless access point disposed thereon for communicating with the wireless adapter 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are example and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 20:
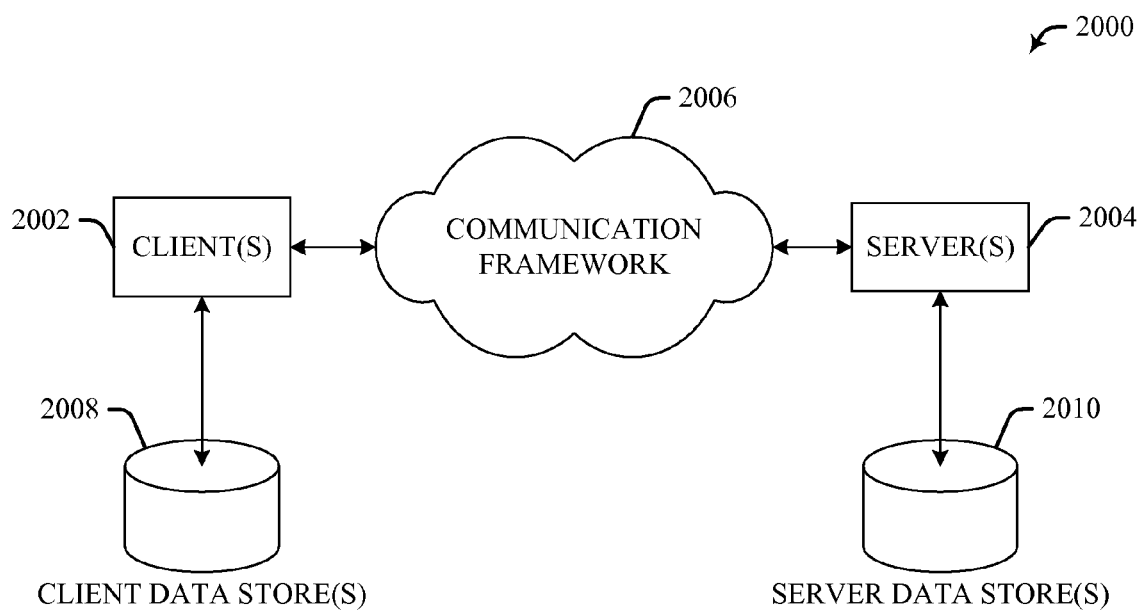
FIG. 20 illustrates a schematic block diagram of an exemplary computing environment in accordance with the subject specification.

Referring now to FIG. 20, there is illustrated a schematic block diagram of a computing environment 2000 for the online media registration system, in accordance with the subject specification. The system 2000 includes one or more client(s) 2002. The client(s) 2002 can be hardware and/or software (e.g., threads, processes, computing devices). The client(s) 2002 can house cookie(s) and/or associated contextual information by employing the specification, for example.

The system 2000 also includes one or more server(s) 2004. The server(s) 2004 can also be hardware and/or software (e.g., threads, processes, computing devices). The servers 2004 can house threads to perform transformations by employing the specification, for example. One possible communication between a client 2002 and a server 2004 can be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A media registration system comprising:
   a memory having computer executable instructions stored thereon;

a processor that executes the computer executable instructions stored on the memory to implement the following components:

a media registration component that collects information regarding at least one media shipment, wherein the shipment comprises a portable electronic media article shipped via a physical mailing service shipment;

a report generation component that establishes at least one report based in part on the information collected; and an analysis component that employs a plurality of risk drivers that analyze at least one of the at least one report or the information collected to at least one of calculate risk or measure accountability as a function of sensitive data included within the at least one media shipment, wherein the plurality of risk drivers comprises data classification, data criticality, number of customer records per unit, number of units shipping, frequency of shipment, carrier track record or receiver track record, wherein the sensitive information comprises at least one of credit card details, bank account information, employee records, usernames, passwords or social security numbers.

2. The system of claim 1, further comprising a user authentication component that authenticates a user to determine the user's role, wherein the user's role is employed to identify an administrative access right.

3. The system of claim 1, further comprising a display component that displays at least one of the information collected or the at least one report.

4. The system of claim 1, further comprising an administration component that provides an interface for an authorized user to perform administrative functions related to the shipment of sensitive information.

5. The system of claim 1, further comprising a data-burn component that automatically triggers registration of portable electronic media containing the sensitive information, wherein the portable electronic media is registered prior to the sensitive information being recorded on the portable electronic media.

6. The system of claim 5, further comprising a validation component that verifies the information recorded on the portable electronic media with the registration of the shipment of the sensitive data.

7. The system of claim 1, further comprising a risk classification component that automatically determines a risk associated with a media registry based at least in part on the information collected or content analysis of the media to identify sensitive information contained in the media.

8. The system of claim 1, further comprising a shipment tracking component that at least one of tracks or monitors the at least one media shipment by integrating with at least one of an internal or third party mailing service.

9. A method to facilitate online registration of media that includes sensitive data, comprising:

employing a processor that executes instructions stored on a computer readable storage medium to implement the following acts:

identifying, via content analysis, sensitive information included in a media shipment, wherein the media shipment comprises a portable electronic media article shipped via a physical delivery service;

collecting delivery information associated with the media shipment upon identification of the sensitive information;

generating one or more reports based in part on a subset of the sensitive and delivery information collected;

analyzing at least one of the one or more reports generated or the information collected; and, at least one of calculating risk or measuring accountability based at least in part on the analysis.

10. The method of claim 9, further comprising assigning a unique registration number to the media shipment.

11. The method of claim 9, further comprising displaying at least one of the delivery information collected or the one or more reports generated based at least in part on user-specified criteria.

12. The method of claim 9, further comprising authenticating a user to determine the user's role, wherein administrative functions are performed based on the user's role.

13. The method of claim 12, further comprising:

automatically ensuring the media shipment containing sensitive information is registered; and verifying the registered information with the information recorded on the media.

14. The method of claim 9, further comprising automatically determining a risk associated with the media shipment based at least in part on the delivery information collected or content analysis that identifies the sensitive information stored in the media.

15. The method of claim 9, further comprising at least one of monitoring or tracking a physical location of the media shipment by integrating with at least one of an internal or third party mailing service.

16. An online media registration system, comprising:

employing a processor that executes computer executable instructions stored on a computer readable storage medium to implement the following means:

means for collecting information associated with a physical, non-electronic shipment of data, wherein the information identifies sensitive information within the data shipment, and wherein the sensitive information comprises financial account information and user identification numbers;

means for generating one or more reports based in part on information collected;

means for analyzing at least one of the one or more reports generated or the information collected; and, means for at least one of calculating risk or measuring accountability based at least in part on the analysis via a plurality of risk drivers; wherein the plurality of risk drivers comprises data classification, data criticality, number of customer records per unit, number of units shipping, frequency of shipment, carrier track record or receiver track record.

17. The system of claim 16, further comprising means for detecting a problem based on the analysis, wherein appropriate authorities are notified when the problem is detected.

18. The system of claim 16, further comprising means for automatically ensuring the data shipment that contains the sensitive information is registered, wherein the registered information is verified with the information recorded on the media.

19. The system of claim 16, further comprising means for automatically determining a risk associated with the media shipment based at least in part on the information collected or content analysis that identifies the sensitive information included within the media.

20. The system of claim 16, further comprising means for at least one of monitoring or tracking the media shipment by integrating with at least one of an internal or third party mailing service.

* * * * *